(12) United States Patent
Sato et al.

(10) Patent No.: US 8,248,206 B2
(45) Date of Patent: Aug. 21, 2012

(54) KEY MANAGEMENT BOX

(75) Inventors: Akihiro Sato, Seki (JP); Masami Umemura, Gifu (JP); Tsutomu Toki, Gifu (JP); Shigeo Fujiyoshi, Seki (JP); Yoshiaki Muto, Seki (JP); Nobuhiko Segi, Motosu (JP)

(73) Assignee: Tokai Riken Co., Ltd., Seki (JP)

( * ) Notice: Subject to any disclaimer, the term of this patent is extended or adjusted under 35 U.S.C. 154(b) by 402 days.

(21) Appl. No.: 12/450,738

(22) PCT Filed: Apr. 16, 2008

(86) PCT No.: PCT/JP2008/057451
§ 371 (c)(1),
(2), (4) Date: Nov. 4, 2009

(87) PCT Pub. No.: WO2008/130000
PCT Pub. Date: Oct. 30, 2008

(65) Prior Publication Data
US 2010/0109837 A1 May 6, 2010

(30) Foreign Application Priority Data

Apr. 16, 2007 (JP) .................... 2007-106941
Oct. 30, 2007 (JP) .................... 2007-281131

(51) Int. Cl.
*B60R 25/00* (2006.01)
(52) U.S. Cl. .............. 340/5.73; 340/5.65; 340/5.21; 340/5.24; 340/5.28
(58) Field of Classification Search .............. 340/5.73, 340/5.65, 5.21, 5.24, 5.28; E05B 49/00
See application file for complete search history.

(56) References Cited

U.S. PATENT DOCUMENTS

| 6,737,961 | B2* | 5/2004 | Flick ................ 340/426.35 |
| 7,042,334 | B2* | 5/2006 | Mosgrove et al. .......... 340/5.73 |
| 7,061,367 | B2* | 6/2006 | Mosgrove et al. .......... 340/5.21 |
| 7,123,127 | B2* | 10/2006 | Mosgrove et al. .......... 340/5.21 |
| 7,152,802 | B2* | 12/2006 | Kell et al. ................ 235/492 |
| 7,340,400 | B2* | 3/2008 | McGinn et al. ............. 705/317 |
| 2010/0109837 | A1* | 5/2010 | Sato et al. ................ 340/5.65 |

FOREIGN PATENT DOCUMENTS

| JP | A-9-259237 | 10/1997 |
| JP | A-10-252327 | 9/1998 |
| JP | A-2005-139789 | 6/2005 |
| JP | A-2006-152604 | 6/2006 |
| JP | A-2007-9475 | 1/2007 |
| JP | A-2007-63858 | 3/2007 |

\* cited by examiner

*Primary Examiner* — Albert Wong
*Assistant Examiner* — Peter Mehravari
(74) *Attorney, Agent, or Firm* — Oliff & Berridge, PLC

(57) ABSTRACT

In a key management box for centrally managing keys used to unlock the locks of a plurality of storage cabinets and comprising a key lock means for making impossible to take out the key, and electronic ID storage section performing personal authentication, and a controller for unlocking the key lock means for a key permitted for a personally authenticated user, the key is an electronic key with an IC tag, the IC tag stores the ID data of a user and data for specifying a storage cabinet permitted for the user to unlock out of a plurality of storage cabinets, and the key management box has a means for reading out the ID data of the IC tag, and a means for unlocking a lock means for a key having the ID data of the user when the electronic key ID storage section identifies a specific user. Consequently, the storage cabinets of the plurality of storage cabinets can be opened/close using one same key.

17 Claims, 9 Drawing Sheets

KEY MANAGEMENT BOX

TECHNICAL FIELD

The present invention relates to a key management box for centrally storing and managing keys to be used by users in order to unlock the locks of a plurality of storage cabinets placed in offices, the key management box including a key lock means for holding the keys and inhibiting removal or detachment of the keys, a personal authentication means, and a control means for unlocking the key lock means for the key permitted for a personally authenticated user.

BACKGROUND ART

In offices, conventionally, keys for individually opening and closing storage cabinets are stored in a key management box. In using one of the keys, a user opens a door of the key management box after authenticated with an ID card or the like and takes out a key to a storage cabinet the user intends to open. The key management box permits the door to be opened only when the user is ID-authenticated with the ID card and has the access right for the subject storage cabinet.

When a user wants to check or get documents in many storage cabinets, the user has to bring around many keys. This is poor in working efficiency. To solve such inconveniences, there is a demand for a system capable of opening and closing a plurality of storage cabinets by use of one same key.

As the system for opening and closing a plurality of storage cabinets by using the same single key, a master key has been known. The master key is able to open and close all the storage cabinets but it is intended for emergency, e.g., if any one personal key is lost. If the master key is daily used, it is meaningless to provide different locks to different storage cabinets for management. Furthermore, it is impossible to set an access right for each storage cabinet to each person.

On the other hand, there is a commercially available configuration using replaceable cylinder locks so that different locks are set in different storage cabinets and the storage cabinets are permitted to be opened and closed with a single key. This makes it possible to arbitrarily set and change storage cabinets permitted to be opened and closed with the same single key.

On the other hand, a technique using an IC tag and a key in combination is disclosed in Patent Literature 1. Patent Literature 1 discloses that a contact IC tag is built in a grip portion of a key, data of the IC tag is read by a door-side data terminal which contacts with a key-side data terminal partly exposed from the grip portion. The key is inhibited from rotating by a solenoid if the data has not been registered as ID.

The key is a normal key having a specific shape for opening/closing a specified lock. An advantage disclosed is that even when a copy of the key is made, the lock is not unlocked unless the contact IC tag is not built in the key. In paragraph [0027], there is disclosed that an electrical lock is unlocked by authentication of only an IC tag.
Citation List
Patent Literature
Patent Literature 1: JP10 (1998)-252327A

SUMMARY OF INVENTION

Technical Problem

The easily replaceable cylinder lock which is conventionally commercially available has the following problems.

(1) This lock is effective in a system to be used by a single person. However, in a system that the same storage cabinet is used by a plurality of persons having different authorities as in general offices or workplaces in a company, it is difficult to permit the persons to individually possess keys available for the storage cabinet. Specifically, for example, in the case where different persons A, B, and C have access rights to access to different storage cabinet groups respectively, each person is not permitted to possess a key for opening and closing a storage cabinet each person is permitted to access to.

(2) Furthermore, the system disclosed in Patent Literature 1 has the following problems.

Specifically, the contact IC tag is merely used for authentication. To actually open/close a key, the shape of an insert portion of the key has to coincide with the lock as before. In offices, therefore, a person who intends to examine some documents stored in a plurality of storage cabinets has to carry around many keys between the storage cabinets. Carrying around many keys is inconvenient and also the person has to find a desired key every time. It is very inefficient.

Unlocking the electrical lock by authentication using the IC tag is almost the same as unlocking the electrical lock by reading the IC tag simply imbedded in a card. It is meaningless to combine the key and the IC tag. In other words, this system requiring the electrical lock leads to a cost increase.

In the technique in Patent Literature 1, the contact IC tag is exposed in the grip portion of the key. Accordingly, a reading device cannot help being placed outside the lock. This may damage the reading device due to equipment collision, mischief, etc.

(3) Furthermore, in recent years, security management in offices becomes stricter in compliance with the law protecting personal information. The keys having been personally managed heretofore are often forbidden from being brought out of the offices. Specifically, there are more and more cases where, when a person who has personally charge of a key intends to go out of an office, the person is obliged to return the key in a key management box.

(4) On the other hand, in the case where personal keys are allocated one each to persons, a key management box is required to store the keys in the number corresponding to the number of persons using the keys in an office. One person usually uses a key only for a short time in a day. Accordingly, even the keys used for a short time all have to be stored, which occupy wasted space in the key management box.

The present invention has been made to solve the above problems and has a purpose to provide a key management box capable of opening and closing storage boxes of a plurality of storage cabinets by using one same key.

Solution to Problem

To achieve the above object, the key management box according to the present invention has the following configurations.

(1) There is provided a key management box for centrally storing and managing keys to be used by users in order to unlock locks of a plurality of storage cabinets placed in offices, the key management box comprising: a key lock means for holding the keys and inhibiting removal of the keys; a personal authentication means; and a control means for unlocking the key lock means for the key permitted for a personally authenticated user, wherein (a) each of the keys is a digital key including an IC tag storing ID data of a user and storage cabinet specifying data that specify two or more storage cabinets permitted for the user to unlock out of the plurality of storage cabinets, and (b) the key management box comprises: a data reading means for reading the ID data of the IC tag; and a lock unlocking means for unlocking the key lock means for the key having the ID data of a specific user when the personal authentication means identifies the subject user.

(2) In the key management box set forth in (1), the IC tag stores a record of use of the storage cabinet, and the data reading means reads the record of use.

(3) There is provided a key management box for centrally storing and managing common keys to be used by a plurality of users in order to unlock locks of a plurality of storage cabinets placed in offices, the key management box comprising: a key lock means for holding the common keys and inhibiting removal of the keys; a personal authentication means; and a control means for unlocking the key lock means for the common key permitted for a personally authenticated user, wherein (a) each of the common keys is a digital key including an IC tag storing ID data of a user and storage cabinet specifying data that specify two or more storage cabinets permitted for the user to unlock out of the plurality of storage cabinets, and (b) the key management box comprises: a data reading means for reading the ID data of the IC tag; a data writing means for writing, into the IC tag of any one of the common keys, at least one of the ID data of a specific user and storage cabinet specifying data of the user when the personal authentication means identifies the subject user; and a lock unlocking means for unlocking the key lock means for the one of the common keys.

Herein, the meaning of "common" is conceived as subjective common use and objective common use; the former represents that one common key is used by a plurality of persons and the latter represents that one common key is available for a plurality of storage cabinets. In this description, taking note of the subjective common, the key to be commonly used by a plurality of users is referred to as a "common key" and the keys allocated one each to persons are referred to as a "personal key".

(4) In the key management box set forth in (3), the IC tag stores a record of use of the storage cabinet, and the data reading means reads the record of use.

(5) There is provided a key management box for centrally storing and managing keys to be used by users in order to unlock locks of a plurality of storage cabinets placed in offices, the key management box comprising: a key lock means for holding the keys and inhibiting removal of the keys; a personal authentication means; and a control means for unlocking the key lock means for the key permitted for a personally authenticated user, wherein the keys include: a personal key that is a digital key including an IC tag storing ID data of a user and storage cabinet specifying data for specifying two or more storage cabinets permitted for the user to unlock out of the plurality of storage cabinets, the personal key being allocated one to each person; and a common key that is a digital key including an IC tag storing ID data of a user and storage cabinet specifying data for specifying two or more storage cabinets permitted for the user to unlock out of the plurality of storage cabinets, the common key being used in common by a plurality of users, and the key management box comprises: a data reading means for reading the ID data of the IC tag; and a data writing means for writing, into the IC tag of any of the common keys, at least one of the ID data of a specific user and storage cabinet specifying data of the user when the personal authentication means identifies the subject user; a first lock unlocking means for unlocking the key lock means for the personal key having the ID data of the specific user when the personal authentication means identifies the subject user; and a second lock unlocking means for unlocking the key lock means for the any of the common keys.

(6) The invention set forth in one of (3) to (5) further comprises a grouping means for grouping the plurality of common keys into a first group complying with a first condition and a second group complying with a second condition.

(7) In the invention set forth in (6), the grouping means creates the first and second groups based on at least one of attributes of the users, frequencies of use of the common key by the users, and time zones of use of the common keys.

(8) The invention set forth in one of (1) to (7), comprises an effective time data writing means for writing, into the IC tag, effective time data representing an effective time for which the storage cabinet is permitted to be unlocked by use of the storage cabinet specifying data.

(9) In the invention set forth in (8), the effective time data writing means changes the effective time according to at least one of an attribute of the user, a type of an article, and an installation place of the storage cabinet and writes the changed effective time into the IC tag.

Advantageous Effects of Invention

The key management box of the invention is to centrally store and manage keys to be used by users in order to unlock locks of a plurality of storage cabinets placed in offices. The key management box comprises: a key lock means for holding the keys and inhibiting removal of the keys; a personal authentication means; and a control means for unlocking the key lock means for the key permitted for a personally authenticated user, wherein (a) each of the keys is a digital key including an IC tag storing ID data of a user and storage cabinet specifying data that specify two or more storage cabinets permitted for the user to unlock out of the plurality of storage cabinets, and (b) the key management box comprises: a data reading means for reading the ID data of the IC tag; and a lock unlocking means for unlocking the key lock means for the key having the ID data of a specific user when the personal authentication means identifies the subject user. When a user intends to sequentially check the storage boxes permitted for the user to unlock, conveniently the user has only to bring around only one key. Since the key management box can also manage a personally managed key, it is possible to forbid the person to bring the key out of an office.

Herein, the control device for managing the lock of the storage cabinet side may store ID data for unlocking the storage cabinet so that the lock is unlocked when the ID data of the IC tag is read.

In the key management box of the invention, the IC tag stores a record of use of the storage cabinet, and the data reading means reads the record of use. Accordingly, when the user returns the key to the key management box, the key management box can obtain the use record of the key and therefore sufficiently manage the key by obtaining which user removed the key in what time and used which storage box from what time to what time.

Furthermore, in a key management box for centrally storing and managing common keys to be used by a plurality of users in order to unlock locks of a plurality of storage cabinets placed in offices, the key management box comprising: a key lock means for holding the common keys and inhibiting removal of the keys; a personal authentication means; and a control means for unlocking the key lock means for the common key permitted for a personally authenticated user, (a)

each of the common keys is a digital key including an IC tag storing ID data of a user and storage cabinet specifying data that specify two or more storage cabinets permitted for the user to unlock out of the plurality of storage cabinets, and (b) the key management box comprises: a data reading means for reading the ID data of the IC tag; a data writing means for writing, into the IC tag of any one of the common keys, at least one of the ID data of a specific user and storage cabinet specifying data of the user when the personal authentication means identifies the subject user; and a lock unlocking means for unlocking the key lock means for the one of the common keys. Since a personal key to a user can be created on site, the number of keys to be managed by the key management box is mere half or about ⅓ of the total number of the users. Thus, the key management box can be made compact.

In the key management box of the invention, the IC tag stores a record of use of the storage cabinet, and the data reading means reads the record of use. Accordingly, when the user returns the key to the key management box, the key management box can obtain the use record of the key and therefore sufficiently manage the key by obtaining the use record, that is, by obtaining which user removed the key in what time and used which storage box from what time to what time.

The key management box of the present invention is to centrally store and manage keys to be used by users in order to unlock locks of a plurality of storage cabinets placed in offices. The key management box comprises: a key lock means for holding the keys and inhibiting removal of the keys; a personal authentication means; and a control means for unlocking the key lock means for the key permitted for a personally authenticated user, wherein the keys include: a personal key that is a digital key including an IC tag storing ID data of a user and storage cabinet specifying data for specifying two or more storage cabinets permitted for the user to unlock out of the plurality of storage cabinets, the personal key being allocated one to each person; and a common key that is a digital key including an IC tag storing ID data of a user and storage cabinet specifying data for specifying two or more storage cabinets permitted for the user to unlock out of the plurality of storage cabinets, the common key being used in common by a plurality of users, and the key management box comprises: a data reading means for reading the ID data of the IC tag; and a data writing means for writing, into the IC tag of any of the common keys, at least one of the ID data of a specific user and storage cabinet specifying data of the user when the personal authentication means identifies the subject user; a first lock unlocking means for unlocking the key lock means for the personal key having the ID data of the specific user when the personal authentication means identifies the subject user; and a second lock unlocking means for unlocking the key lock means for the any of the common keys. According to this key management box, even a person who uses the electronic key at low frequently is permitted to unlock the storage cabinet with the common key. The plurality of users share the common keys and thus the key management box can reduce the number of electronic keys to be managed as compared with the case of managing personal keys allocated individually to users.

The key management box of the invention further comprises a grouping means for grouping the plurality of common keys into a first group complying with a first condition and a second group complying with a second condition. Accordingly, the common keys belonging to the first group and the common keys belonging to the second group are allowed to be used by users under different conditions (e.g., users' attributes, frequencies of use of the common keys by the users, and time zones of use of the common keys).

The key management box of the invention further comprises an effective time data writing means for writing, into the IC tag, effective time data representing an effective time for which the storage cabinet is permitted to be unlocked by use of the storage cabinet specifying data. Accordingly, after the effective time has passed, the digital key removed from the key management box loses the function as a key and cannot unlock the storage cabinet even when the key is inserted in the lock of the storage cabinet. According to the key management box of the invention, the risk of malicious use of the digital key can be reduced.

In the key management box of the invention, the effective time data writing means changes the effective time according to at least one of an attribute of the user, a type of an article, and an installation place of the storage cabinet and writes the changed effective time into the IC tag. In this key management box of the invention, the effective time suitable for the user, the stored article, and the installation place of the storage cabinet is stored in the IC tag. It is therefore possible to reduce the opportunity of malicious use of the digital key by a third person as compared with the case where the effective time is set uniformly. Security can thus be improved.

REFERENCE SIGNS LIST

Figure 1:
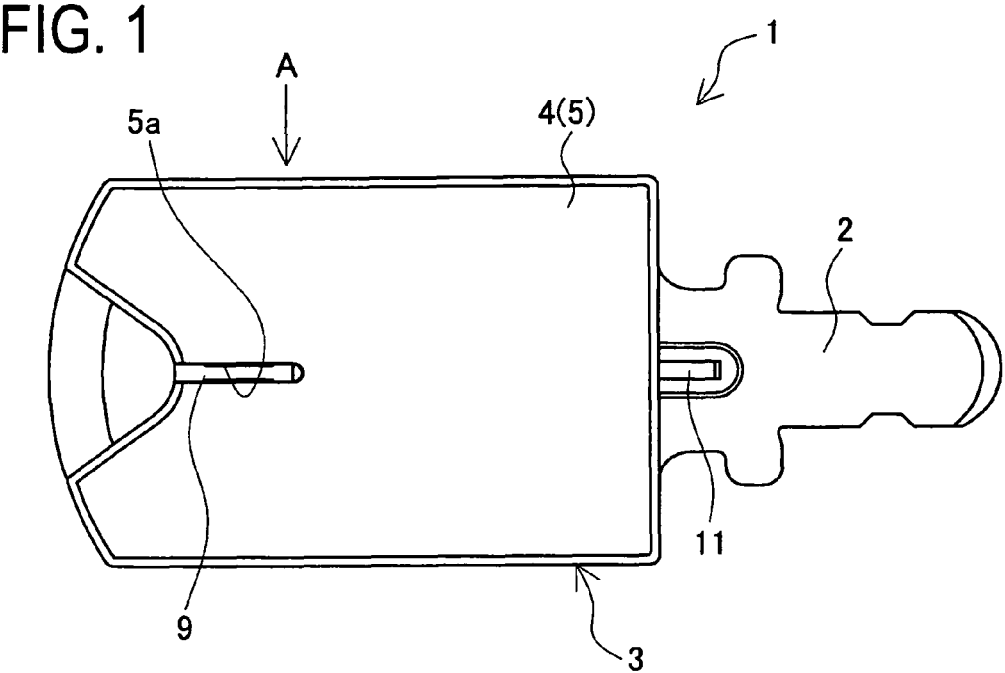
FIG. 1 is a plan view showing an appearance of an electronic key in an embodiment of the invention.

1 Electronic key
30 Key management box
32 IC card reader
33 Numeric keypad
34 Liquid crystal display
35 Key hole
38 Key hole unit
40 Effective time data writing means
43 LED
47 Electronic key ID storage section
48 Access right storage section
49 Record storage section
50 Control program

DESCRIPTION OF EMBODIMENTS

A detailed description of a preferred embodiment of a key management box embodying the present invention will now be given referring to the accompanying drawings.

An electronic key 1 which is a digital key used in this embodiment will be first explained.

<Electronic Key>

Figure 2:
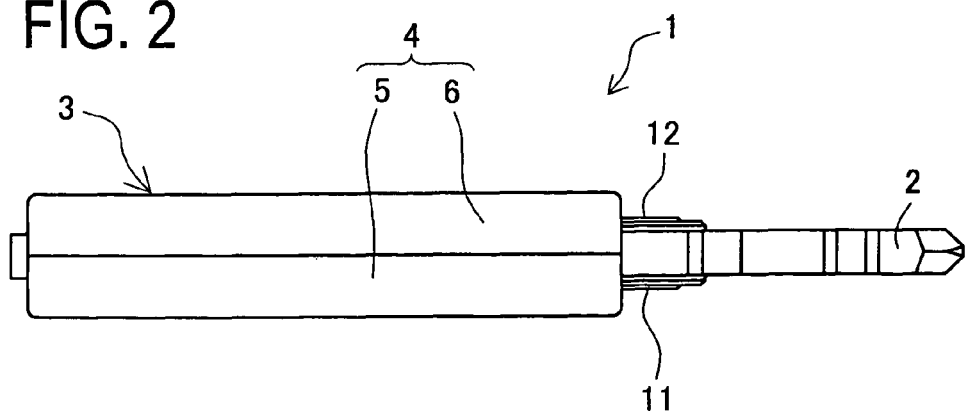
FIG. 2 is a side view seen from an arrow A in FIG. 1.

FIG. 1 is a plan view of the electronic key 1. FIG. 2 is a view of the electronic key 1 seen from a direction A in FIG. 1.

In the electronic key 1, an IC unit 3 is attached to a metal insert element 2. The IC unit 3 has an external appearance made by a resin case 4 to prevent static electricity. The case 4 includes a first case part 5 and a second case part 6 joined together, forming a hollow part therebetween in which a frame portion 2a of the insert element 2 (see FIG. 3) is housed.

An LED 9 is placed to be exposed through an opening 5a formed in the first case part 5 to make a blinking state visible. The IC unit 3 is configured such that a first terminal 11 and a second terminal 12 of an IC tag 13 (see FIG. 3) are extended out of the case 4 and on both sides of the insert element 2.

Figure 3:
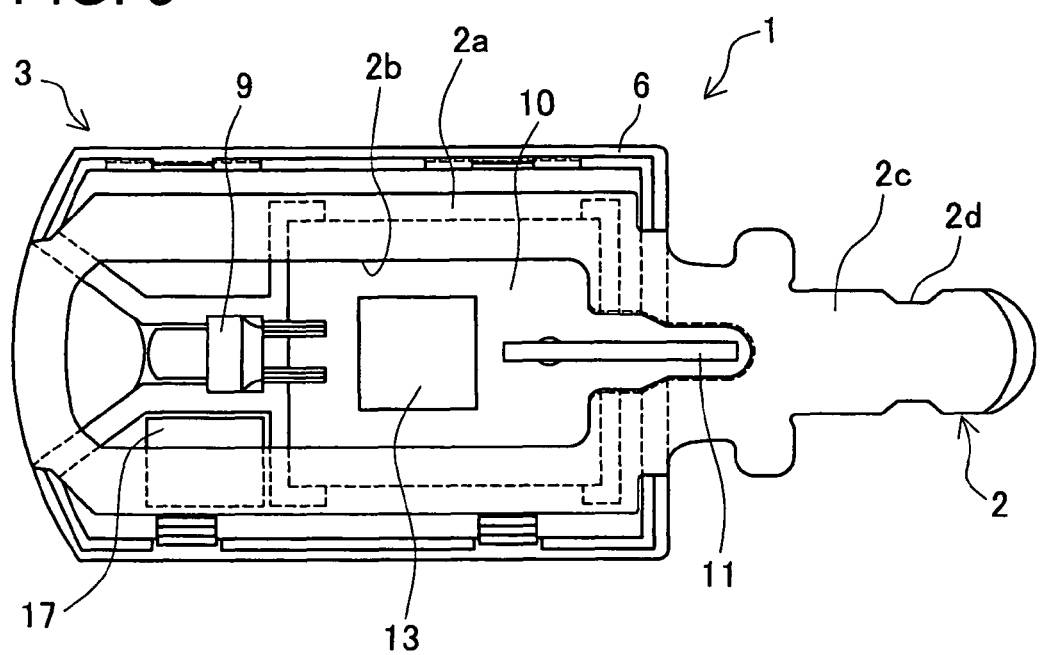
FIG. 3 is a cross sectional view showing an internal structure of the electronic key.

FIG. 3 is a view showing an internal structure of the electronic key 1 shown in FIG. 1.

The frame portion 2a of the insert element 2 is integrally formed with an insert portion 2c protruding out of the case 4. The frame portion 2a is formed with an opening 2b in which the IC tag 13 and the LED 9 both mounted on an substrate 10 for IC tag are disposed to prevent wiring or the like of the IC tag 13 and the LED 9 from touching the insert element 2. The insert element 2 is formed with a recess 2d engageable with a lock means. On the substrate 10, the IC tag 13, the first terminal 11 and the second terminal 12 (see FIG. 2) of the IC tag 13, and the LED 9 are mounted by soldering or the like. The IC unit 3 is provided with a battery 17 to drive the IC tag 13 even when no current is supplied from outside.

<Electric Circuit Configuration of Electronic Key>

Figure 4:
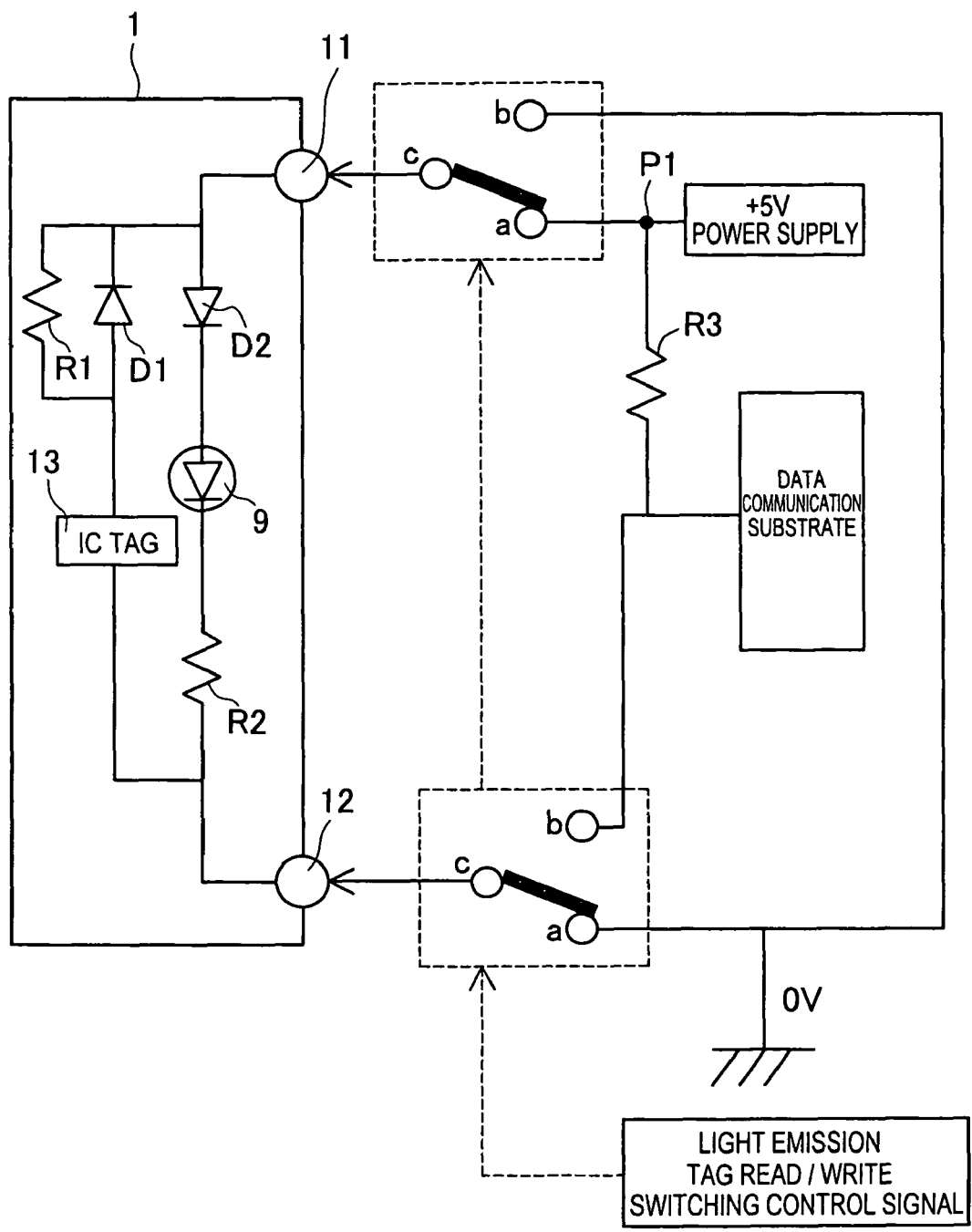
FIG. 4 is a circuit diagram showing an electrical circuit configuration of the electronic key.

FIG. 4 is a block diagram showing the read/write circuit of the electronic key 1 shown in FIG. 1.

In the electronic key 1, a first rectifier diode D1 has an anode coupled to the IC tag 13 and a cathode coupled to the first terminal 11 to allow a current to flow from the second terminal 12 to the first terminal 11. A first resistor R1 is arranged in parallel with the first rectifier diode D1. Even when a slight current flows in the contact IC tag 13 which is a nonlinear element, accordingly, the first rectifier diode D1 is switched to an ON state.

In the electronic key 1, furthermore, the LED 9 is arranged in parallel with the contact IC tag 13. A second rectifier diode D2 has an anode coupled to the first terminal 11 and a cathode coupled to the LED 9 to allow a current to flow from the first terminal 11 to the second terminal 12. A second resistor R2 is arranged between the LED 9 and the second terminal 12 to stabilize the current flowing in the LED 9. The first and second rectifier diodes D1 and D2 and the first and second resistors R1 and R2 constitute a "circuit switching means" for switching between a circuit for supplying a current to the IC tag 13 and a circuit for supplying a current to the LED 9.

<Logical Block Configuration of Electronic Key>

Figure 5:
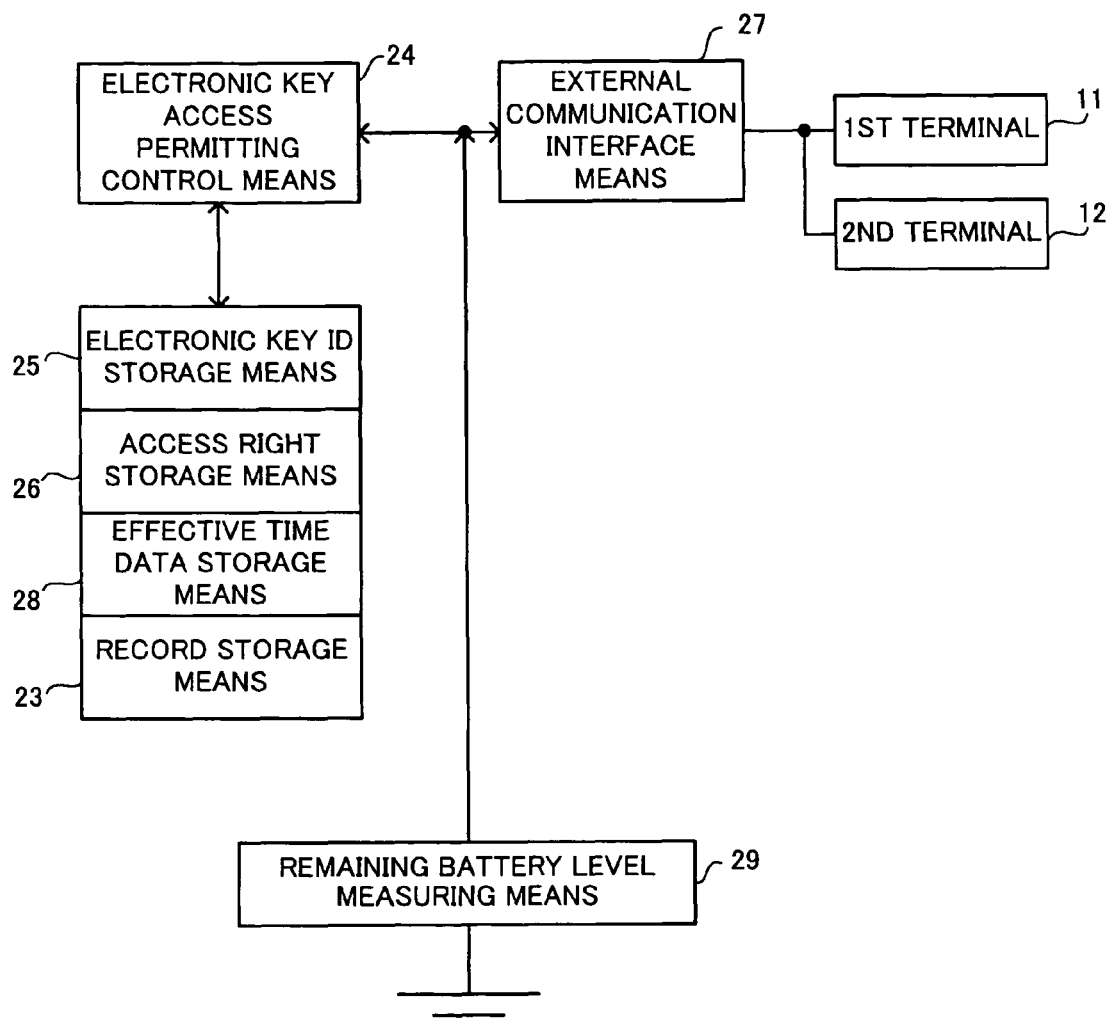
FIG. 5 is a block diagram showing a control configuration of the electronic key.

FIG. 5 is a logical block diagram of the electronic key 1 shown in FIG. 1.

The electronic key 1 is provided with an electronic key access permission control means 24 and an external communication interface means 27.

The electronic key access permission control means 24 normally shuts off a circuit for connecting the first and second terminals 11 and 12. The electronic key access permission control means 24 connects the first and second terminals 11 and 12 when the electronic key 1 is removed from of the key management box, thereby permitting the external communication interface means 27 to access to an electronic key ID storage means 25, an access right storage means 26, an effective time data storage means 28, and a record storage means 23.

The electronic key ID storage means 25 is to store "electronic key ID". Herein, the electronic key ID is a unique identification number to identify the electronic key 1. In this embodiment, a unique identification number of the contact IC tag 13 is stored as the "electronic key ID" in the electronic key ID storage means 25. The commercially available IC tag 13 stores a unique identification number assigned when manufactured. No IC tag 13 has the same identification number in the world. Rewriting of the identification number is difficult. Accordingly, the electronic key 1 directly using the identification number of the IC tag 13 is distinguishable from another electronic key 1 without needing works to add and store an individual identification number to the electronic key 1 during manufacture. The "personal ID number" represents an identification number assigned to each person.

The access right storage means 26 is to store the "access right" of a person who possesses the electronic key 1. The "access right" indicates an authority to open and close a storage cabinet. The access right storage means reads and writes storage cabinet specifying data for specifying two or more storage cabinets a user is permitted to unlock (an access right) out of a plurality of storage cabinets.

The effective time data storage means 28 is to store effective time data representing an effective time for which a storage cabinet is permitted to be unlocked by use of the storage cabinet specifying data. The effective time data is written in the effective time data storage means 28 before the electronic key 1 is removed from a key management box 30 mentioned later.

The record storage means 23 is written with use records such as an identification number of the storage cabinet when the storage cabinet is unlocked by use of the electronic key 1, unlocking date and time, and locking date and time, etc. From the record storage means 23, the use record is read by the key management box 30 when the electronic key 1 is returned to the key management box 30.

The external communication interface means 27 is to control communication with a data reading means (e.g., a lock control device, an IC tag reading means 42 mentioned later, etc.) which will contact with the first and second terminals 11 and 12 to read/write data with respect to the IC tag 13.

A remaining battery level measuring means 29 is connected between the electronic key access permission control means 24 and the external communication interface means 27. The remaining battery level measuring means 29 monitors a remaining level of the battery 17 (see FIG. 3) and causes the LED 9 (see FIGS. 1 and 3) to blink in case the remaining level of the battery 17 decreases below a predetermined level, thereby indicating to a user that the remaining battery level is low.

<Electronic key management system>

Figure 6:
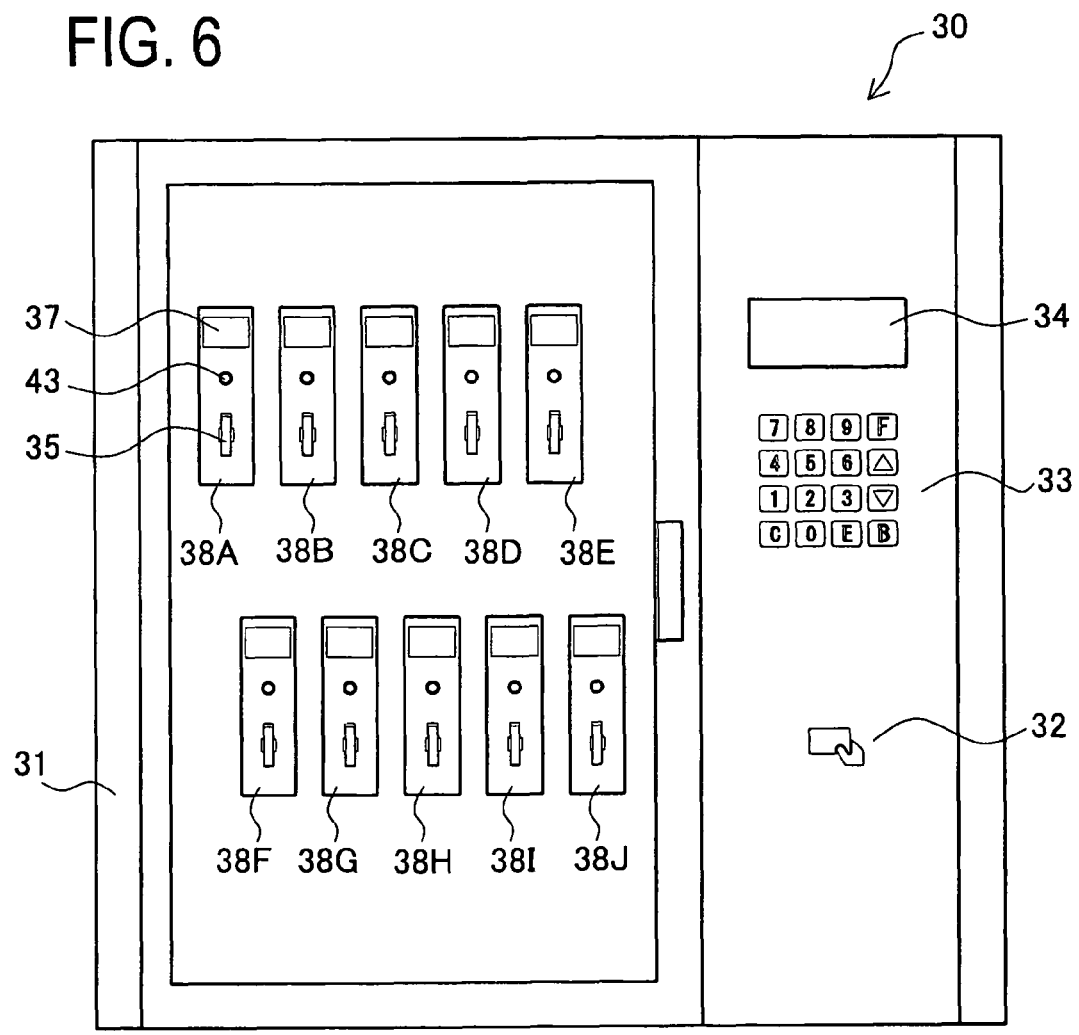
FIG. 6 is a front view of a key management box in one embodiment of the invention.

The following explanation is given to a system for managing the electronic key 1. FIG. 6 is a configuration view of the key management box 30. The key management box 30 is provided with an opening and closing door 31 which is normally closed. Inside the key management box 30, behind the door 31, key hole units 38 (38A to 38J) are provided to hold ten electronic keys 1 (see FIG. 1). On the front surface of a right side of the door 31 of the key management box 30, an IC card reader 32, a numeric keypad operating part 33, and a liquid crystal display 34 are provided. Each key hole unit 38 includes a key hole 35 in which the electronic key 1 is inserted, an LED 43, and a name plate 37. Each key hole 35 is in a normal state of inhibiting removal of the electronic key 1 by a key lock means 41 (see FIG. 7) which is a key removal inhibiting means.

Figure 7:
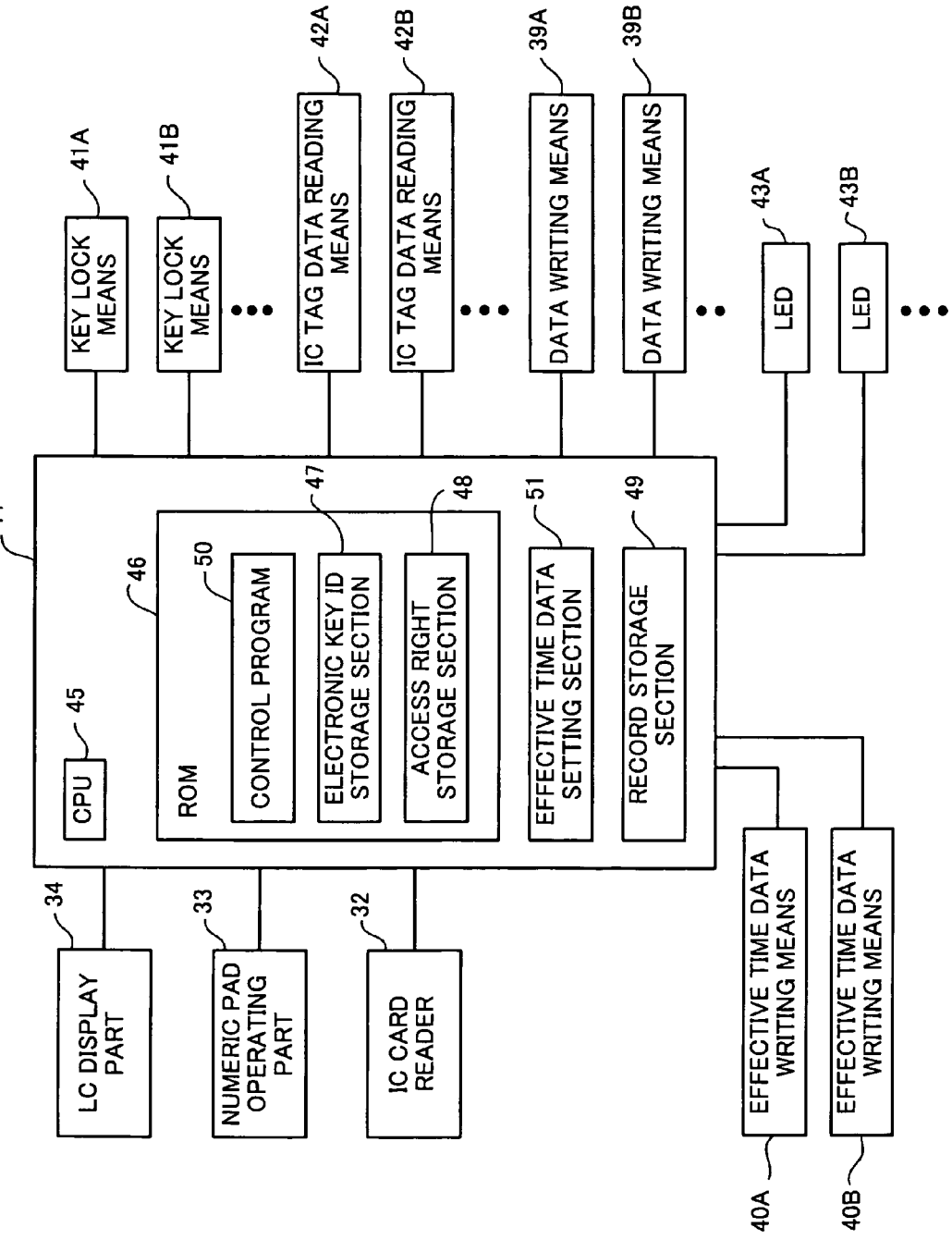
FIG. 7 is a block diagram showing a control configuration of the key management box.

A controller of the key management box 30 is described below. FIG. 7 is a block diagram showing a control configuration. A controller 44 includes a CPU 45, a ROM 46, and a record storage section 49. The ROM 46 includes a control program 50, an electronic key ID storage section 47, an access right storage section 48, and an effective time data setting section 51.

The controller 44 is coupled to key lock means 41A to 41J for locking the electronic keys 1 attached to corresponding key hole units 38 to inhibit removal of the electronic keys 1, IC tag data reading means 42A to 42J for reading out data stored in the IC tags 13 built in the electronic keys 1 when the electronic keys 1 are fitted, effective time data writing means 40A to 40J for writing effective time data in the effective time data storage means 28 of the electronic keys 1, data writing means 39A to 39J, and LEDs 43A to 43J. The controller 44 is also connected to the liquid crystal display 34, the numeric keypad operating part 33, and the IC card reader 32.

<Use Mode of Key Management Box>

A use mode of the key management box 30 in the embodiment is explained below.

Two use modes are conceived for the use of the key management box 30 having the above configuration. Those modes are switched by the control program 50 stored in the ROM 46. The two modes, that is, a personal key mode and a common key mode are explained in sequence.

<Personal Key Mode>

This is a managing mode of individually allocating the electronic keys 1 to persons. The key management box 30 shown in FIG. 6 can manage the electronic keys 1 for ten persons. In this embodiment, a unique identification number (electronic key ID) stored in the electronic key ID storage means 25 of each electronic key 1 is a unique identification number of the contact IC tag 13. Commercially available contact IC tags have unique identification numbers respectively, which are convenient because there is no same identification number and rewriting of each identification number is difficult.

The electronic key ID storage means 25 stores the information of a specific person corresponding to the electronic key ID.

Figure 8:
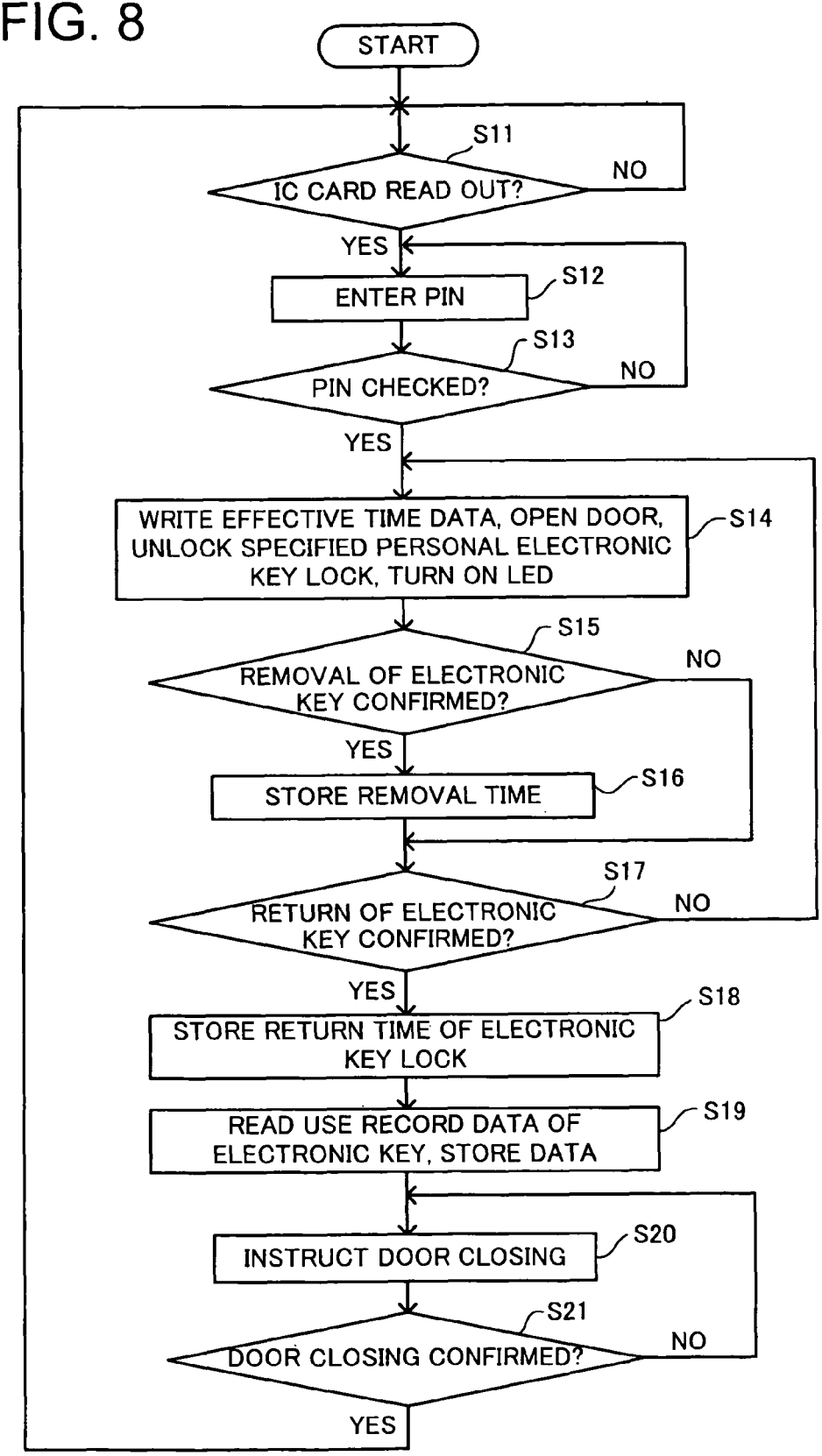
FIG. 8 is a flowchart showing a control method for the electronic key to be used as a personal key.

FIG. 8 is a flowchart showing the control program 50 in the case of the personal key mode.

A user goes to the key management box 30 and lets his/her IC card be read by the IC card reader 32 (S11: YES). The user then enters a personal ID number (PIN) with the numeric keypad operating part 33 (S12). The electronic key ID storage section 47 of the controller 44 has stored in advance a personal ID number corresponding to the IC card read by the IC card reader 32 and checks the entered personal ID number against the stored personal ID number (S13). Only if the personal ID number is proper (S13: YES), the effective time data writing means 40 writes the effective time data set by the effective time data setting section 51 into the effective time data storage means 28 of the electronic key 1, and the door 31 is permitted to be open. In this embodiment, the numeric keypad operating part 33 is used as above, but personal authentication may be performed by a vein authentication device, a fingerprint authentication device, and others. Performing personal authentication is to prevent malicious use of the IC card by a third person.

Herein, the effective time data setting section 51 sets effective time data based on at least one of a user's attribute, the type of stored article(s), and an installation place of the storage cabinet.

For instance, the effective time data setting section 51 has stored user information by classifying them into an employee class, a manager class, a general manager class, and an executive officer class. For example, the length of an effective time is set according to classes so that the effective time for the employee class is 5 min., that for the manager class is 10 min., that for the general manger class is 15 min., and that for the executive officer class is 20 min.

For example, taking into consideration the time length needed for opening a storage cabinet and confirming the contents of a document(s), the effective time data setting section 51 sets the effective time to the storage cabinet that stores document file(s) to be longer than the effective time to the storage cabinet that stores a CD-ROM(s) or a USB memory(s).

For example, in the case where the key management box 30 is located on the second basement of a building with ten stories above the ground and two stories below, the effective time data setting section 51 sets the effective time to the storage cabinet on the tenth floor to be longer than the storage cabinet on the second floor.

The controller 44 permits the door 31 to be opened and simultaneously unlocks the key lock means 41 of the key hole unit 38 attached with the personal electronic key 1 of a personally authenticated user (S14). The key lock means 41 performs engagement and disengagement with respect to the recess 2d of the key by operation of an engagement claw by a solenoid. The LED 43 of the unlocked key hole unit 38 is turned on (S14). The user is permitted to remove the personal electronic key 1. When the IC tag data reading means 42 no longer detects the electronic key 1, the controller 44 determines that the electronic key 1 has been removed from the key hole 35 (S15: YES) and stores the information of the authenticated person, the removed electronic key 1, and the removal time into the record storage section 49 (S16).

In the key management box 30, the electronic key 1 is directly inserted in the key hole 35. Accordingly, the IC tag data of the inserted electronic key 1 is read by the IC tag data reading means 42 provided in the key hole unit 38. It is therefore possible to reliably manage whether or not the electronic key 1 is a proper key.

In the personal key mode, the storage cabinet specifying data of a specific person corresponding to the electronic key 1 is stored in advance in the access right storage means 26 of the electronic key 1. Herein, if the number of storage cabinets to which a specific person is permitted to access is changed, the storage cabinet specifying data stored in the access right storage means 26 is rewritten while the electronic key 1 is stored in the key management box 30. To ensure security, the electronic key 1 is basically returned to the key management box 30 excepting use time. The electronic key 1 therefore stores a latest storage cabinet specifying data in prompt response to a change in access right, thereby avoiding disadvantages that the storage cabinet(s) could not be used by the specific person having an access right to the storage cabinet(s).

A conventional electronic key stores the information of only one storage cabinet available to a person and is used as a special key to the storage cabinet. The storage cabinet stores an electronic key ID of the person having an access right thereto in a memory. The storage cabinet is thus unlocked when an electronic key ID read from the electronic key coincides with one registered in the memory. If the access right is changed, the storage cabinet rewrites or updates the electronic key ID registered in the memory. If this rewriting is manually made in each storage cabinet, it would be troublesome and may cause input omission. On the other hand, if the storage cabinet is coupled to a server through a network, a troublesome input work and a risk of input omission can be reduced but the system is apt to be high in cost. To the contrary, if the storage cabinet adopts an unlocking system to unlock when the storage cabinet determines that the electronic key 1 having stored storage cabinet specifying data in the access right storage means 26 includes an identification number managed by the storage cabinet itself, it is unnecessary to store an electronic key ID of a person having an access right or establish a network. Thus, a system appropriately adapted to respond to a change of the access right can be constituted at low cost.

When the electronic key 1 is to be removed, for example, the key management box 30 stores the effective time data indicating that the storage cabinet A is unlockable for 5 min. from the time the electronic key 1 is taken out of the key management box 30. The user goes from the installation place of the key management box 30 to the storage cabinet A storing desired articles (document files, CD-ROMs, USBs, personal computer, etc.) and then inserts the electronic key 1 in a key unit of the storage cabinet.

The lock of the storage cabinet A is provided with an IC tag data reading means for reading data from the IC tag 13 of the electronic key 1 by contacting with the first and second terminals 11 and 12 of the IC tag 13. The IC tag data reading means in the key unit reads the effective time data corresponding to the storage cabinet A from the effective time data storage means 28. When the electronic key 1 is inserted in the lock of the storage cabinet A within the effective time indicated by the effective time data, the key unit permits opening and closing of the storage cabinet A. On the other hand, when the electronic key 1 is not inserted in the lock of the storage cabinet A within the effective time indicated by the effective time data, the key unit does not permit opening and closing of the storage cabinet A. In this way, the electronic key 1 loses the function as a key to the storage cabinet A after a lapse of the effective time.

In case the effective time passes before the user returns the electronic key 1 to the key management box 30 after the storage cabinet A is opened and closed, even the user having a proper authority is not permitted to open and close the storage cabinet A by use of the subject electronic key 1. In this case, the user has to once return the electronic key 1 to the key management box 30 and then take out the electronic key 1 again so that the effective time data is written into the electronic key 1. Thus, the storage cabinet can be opened and closed by the electronic key 1.

When the storage cabinet is unlocked, the controller of the storage cabinet side writes the identification number of the storage cabinet, the unlocking date and time, and the locking date and time into the record storage means 23 of the electronic key 1. Furthermore, the storage cabinet includes a photographing means such as a CCD camera disposed near the lock in which the electronic key 1 is to be inserted. The photographing means serves to photograph the face of a person who unlocks the storage cabinet. The controller of the storage cabinet side writes image data captured by the photographing means as one of use record into the record storage means 23 of the electronic key 1. In the case where a plurality of the storage cabinets is unlocked with the electronic key 1, the record data of all the storage cabinets is stored in the record storage means 23 of the electronic key 1.

When the electronic key 1 is returned to the key management box 30 (S15: NO), the IC tag data reading means 42 reads the electronic key ID of the electronic key 1, confirms that the proper electronic key 1 allocated to the specific person personally authenticated has been returned (S17: YES), and stores a return time in the record storage section 49 (S18). The use record read from the record storage means 23 of the electronic key 1 by the IC tag data reading means 42 of the controller 44 is stored as the use record of the personal electronic key 1 into the record storage section 49 (S19).

As above, the record storage section 49 stores all the removal date and time, the return date and time, and the use record of each electronic key 1 from the key management box 30.

If any trouble such as loss of document(s) from a storage cabinet occurs later, it is possible to ascertain a person responsible for the loss by checking the use record stored in the record storage means 23 of the electronic key 1 and the record storage section 49 of the controller 44. Making it known to users that all records are managed is expected to prompt the users to quickly utilize the storage cabinets after taking out the electronic keys 1 from the key management box 30. It is therefore effective to avoid such a situation that the electronic key 1 is left behind on a desk for a long time.

Thereafter, the liquid crystal display 34 is caused to display a message instructing to close the door 31 (S20). After confirmation that the door 31 has been closed (S21: YES), the flow is returned to S1.

According to the key management box 30 in the personal key mode, the key management box 30 is configured to centrally store and manage the keys to be used by users in order to unlock the locks of the storage cabinets placed in offices, and include the key lock means 41 for holding the keys and inhibiting removal of the keys, the numeric keypad operating part 33 and the electronic key ID storage section 47 both serving as personal authentication means, and the controller 44 for unlocking the key lock means 41 to the key permitted for a personally authenticated user. In the key management box 30, (a) the electronic key 1 is a key provided with the IC tag 13, and the IC tag 13 stores ID data of a user and storage cabinet specifying data for specifying two or more storage cabinets permitted for the user to unlock, out of the plurality of storage cabinets, and (b) the key management box 30 includes the IC tag data reading means 42 for reading the ID data of the IC tag 13 and the unlocking means (S14) for unlocking the key lock means 41 to the key having the ID data of the subject user when the electronic key ID storage section 47 identifies the user (S13: YES). Therefore the user conveniently has only to carry around a single key to sequentially check the storage boxes the user permitted to unlock. The keys personally managed by users can also be managed in the key management box. Accordingly, it is possible to forbid the users from bringing the keys out of the offices.

The key management box 30 in this embodiment, the IC tag 13 stores the use record indicating the use of the storage cabinet and the IC tag data reading means 42 reads the use record (S19). When the user returns the key to the key management box, the key management box can obtain the use record of the subject key, specifically, what time the user removed the key and used which storage box from what time to what time. Thus, sufficient key management can be achieved.

The key management box 30 in this embodiment includes the effective time data writing means 40 for writing, into the IC tag 13 of the electronic key 1, the effective time data indicating the effective time for permitting the storage cabinet to be unlocked by the storage cabinet specifying data. After the effective time specified by the effective time data passes, accordingly, the electronic key 1 removed from the key management box 30 loses the function as a key and is not permitted to unlock the storage cabinet even when the electronic key 1 is inserted in the lock of the storage cabinet. The key management box 30 in this embodiment can therefore reduce the risk of malicious use of the electronic key 1.

In the key management box 30 in this embodiment, the effective time data writing means 40 changes the effective time according to at least one of the user's attribute, the type of stored article(s), and the installation place of the storage cabinet, and writes the changed effective time into the IC tag 13. Such key management box 30 stores the effective time suitable for the user, the article(s), and the installation place of the storage cabinet into the IC tag 13. This makes it possible to reduce opportunities of malicious use of a digital key by a third person as compared with the case where the effective time is set uniformly. Security can therefore be improved. Even if the electronic key 1 has lost the function as a key after a lapse of the effective time, in case the electronic key 1 is stolen by a third person, the user bears responsibility based on the use record remaining in the key management box 30. Users are therefore expected to return the electronic keys 1 early. Thus, security can also be enhanced.

<Common Key Mode>

As the meaning of "common", subjective common use and objective common use are conceived; the former represents that one common key is used by a plurality of persons and the latter represents that one common key is available for a plurality of storage cabinets. In this description, taking note of the subjective common, the keys to be commonly used by a plurality of users are referred to as "common keys" and the keys personally allocated one each to persons are referred to as "personal keys". The common key mode is therefore a mode for managing the electronic keys 1 as the common keys without individually allocating electronic keys 1 to persons. A basic structure and others are identical to those in the personal key mode. Thus, the following explanation will be given to only differences.

The key management box 30 shown in FIG. 6 can manage ten electronic keys 1.

Figure 9:
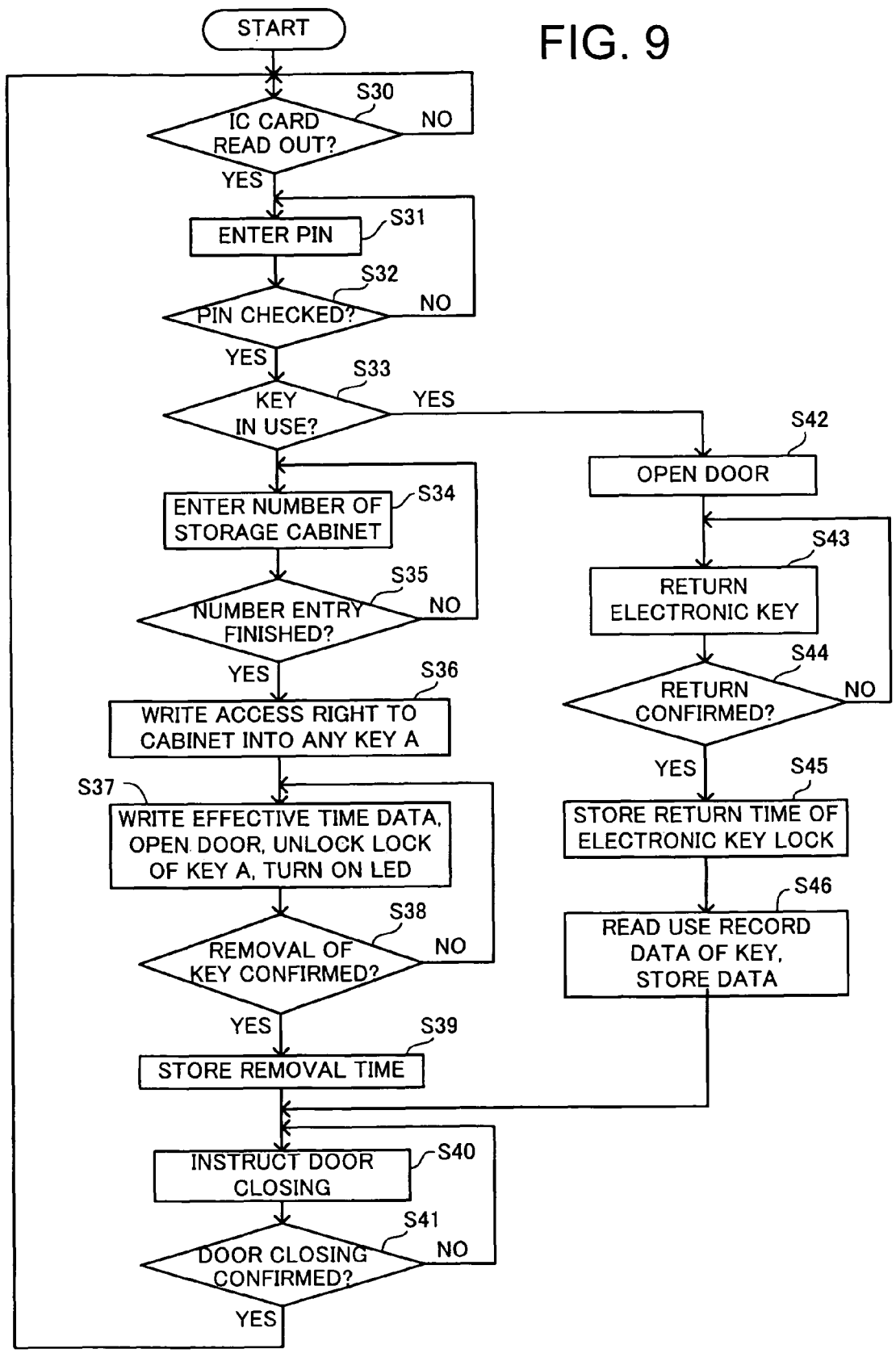
FIG. 9 is a flowchart showing a control method for the electronic key to be used as a common key.

FIG. 9 is a flowchart of the control program 50 in the common key mode.

A user goes to the key management box 30 and lets his/her IC card be read by the IC card reader 32 (S30: YES). With the numeric keypad operating part 33, the user enters the personal ID number (S31). The electronic key ID storage section 47 of the controller 44 has stored in advance a personal ID number corresponding to the IC card read by the IC card reader 32 (S32). Only if the proper personal ID number is entered (S32: YES), the door 31 is permitted to open. In this embodiment, the numeric keypad operating part 33 is used as above, but personal authentication may be performed by a vein authentication device, a fingerprint authentication device, and others. Performing personal authentication is to prevent malicious use of the IC card by a third person.

The control following S33 is divided into two routes. When the controller 44 determines that the user is not using the electronic key 1 (S33: NO), the flow advances to S34. On the other hand, when the controller 44 determines that the user is using the electronic key 1 (S33: YES), the flow advances to S42.

The case where the user is not using the electronic key 1 (S33: NO) is first explained below.

In this case, the liquid crystal display 34 displays a message prompting entry of the number of the desired storage cabinet desired by the user (S34). In this case, it is preferable to display graphics by utilizing the characteristics of the liquid crystal display 34 so that the user can easily specify the number of the storage cabinet.

Upon entry of the number of the storage cabinet by the user (S34), the liquid crystal display 34 displays whether or not entry of the number is finished for confirmation (S35). If the user intends to unlock a plurality of storage cabinets, the user enters all the numbers of the desired storage cabinets (S34, S35).

The controller 44 checks the access right of the user personally authenticated in the access right storage section 48. If the user has access to all the storage cabinets whose numbers are specified by the user, the data writing means 39 writes those numbers in the access right storage means 26 of any one electronic key 1 currently housed in the key management box 30 (S36). Simultaneously, the effective time data set by the effective time data setting section 51 and the ID number of the personally authenticated user are written in the electronic key ID storage means 25 (S36). When the number of the storage cabinet to which the user has no access is entered, that effect is displayed on the liquid crystal display 34.

The controller 44 permits the door 31 to be opened and simultaneously unlocks the key lock means 41 of the key hole unit 38 attached with the selected electronic key 1 in which data has been written (S37). The key lock means 41 performs engagement and disengagement with respect to the recess 2*d* of the key by operation of the engagement claw by the solenoid. Furthermore, the LED 43 of the unlocked key hole unit 38 is turned on (S37). The user is thus permitted to remove the selected electronic key 1. When the IC tag data reading means 42 no longer detects the electronic key 1, the controller 44 determines that the electronic key 1 has been removed from the key hole 35 (S38; YES) and stores the information of the authenticated person, the removed electronic key 1, and the removal time into the record storage section 49 (S39). Thereafter, the liquid crystal display 34 is caused to display a message instructing to close the door 31 (S40). After confirmation that the door 31 has been closed (S41: YES), the flow is returned to S30.

In the key management box 30, the electronic key 1 is directly inserted in the key hole 35. The IC tag data of the attached the electronic key 1 is read by the IC tag data reading means 42 provided in the key hole unit 38. It is therefore possible to reliably manage whether or not the electronic key 1 is a proper key.

In the case where the storage cabinet is unlocked, the controller of the storage cabinet side writes the identification number of the storage cabinet, the unlocking date and time, and the locking date and time into the access right storage means 26. When the plurality of storage cabinets are unlocked by the electronic key 1, the use record data of all the storage cabinets are stored in the access right storage means 26 of the electronic key 1.

The case where the user is currently using the electronic key 1 (S33: YES) is explained below. In this case, the controller 44 permits the door 31 to be opened and simultaneously unlocks the key lock means 41 of the key hole unit 38 attached with no electronic key 1 (S42).

The user returns the electronic key 1 to any one key hole 35 attached with no electronic key 1 (S43). When the electronic key 1 is returned to the key management box 30, the IC tag data reading means 42 reads the electronic key ID of the electronic key 1, confirms that the electronic key 1 removed by a specific person personally authenticated has been returned (S44: YES), and stores the return time into the record storage section 49 (S45). Subsequently, the use record data read from the electronic key 1 by the IC tag data reading means 42 of the controller 44 is stored as the use record of the personal electronic key 1 into the record storage section 49 (S46).

Thus, the record storage section 49 stores, with respect to each electronic key 1, all of the removal date and time from the key management box 30, the returning date and time, and the use records in the storage cabinet(s).

If any trouble such as loss of a document(s) in a storage cabinet occurs later, it is possible to ascertain a person responsible for the loss by checking the use record. Making it known to users that all records are managed is expected to prompt the users to quickly utilize the storage cabinets after taking out the electronic keys 1 from the key management box 30. It is therefore effective to avoid such a situation that the electronic key 1 is left behind on a desk for a long time.

Thereafter, the liquid crystal display 34 is caused to display a message instructing to close the door 31 (S40). After confirmation that the door 31 has been closed (S41: YES), the flow is returned to S30.

According to the key management box 30 in the common key mode, the key management box 30 is configured to centrally store and manage the keys to be used by users in order to unlock the locks of the storage cabinets placed in offices, and includes the key lock means 41 for holding the keys and inhibiting removal of the keys, the numeric keypad operating part 33 and the electronic key ID storage section 47 both serving as personal authentication means, and the controller 44 for unlocking the key lock means 41 of the key permitted for a personally authenticated user. In the key management box 30, (a) the electronic key 1 is a key provided with the IC tag 13, and the IC tag 13 stores ID data of a user and storage cabinet specifying data for specifying two or more storage cabinets permitted for the user to unlock out of the plurality of storage cabinets, and (b) the key management box 30 includes the IC tag data reading means 42 for reading the ID data of the IC tag 13, the data writing means (S36) for writing at least one of the ID data of the subject user and the storage cabinet specifying data for specifying the storage cabinet permitted for the user to unlock into the IC tag 13 of any one electronic key 1 when the personal authentication means identifies the specific user, and the unlocking means (S37) for unlocking the key lock means 41 of any one electronic key 1. Accordingly, a personal key to the user can be created on site. The key management box therefore has only to manage the keys in the number corresponding to half or ⅓ of all users and hence can be made compact.

In this embodiment, the IC tag 13 stores the use record related to the storage cabinet used by the user and the IC tag data reading means 42 reads the use record. When the user returns the electronic key 1 to the key management box 30, the key management box 30 can obtain the use record of the subject electronic key 1, specifically, what time the user removed the key and used which storage box from what time to what time. Thus, sufficient key management of the electronic key 1 can be achieved.

The key management box 30 in this embodiment includes the effective time data writing means 40 for writing, into the IC tag 13 of the electronic key 1, the effective time data indicating the effective time for permitting the storage cabinet to be unlocked by the storage cabinet specifying data. After the effective time specified by the effective time data passes, the electronic key 1 removed from the key management box 30 loses the function as a key and is not permitted to unlock the storage cabinet even when the electronic key 1 is inserted in the lock of the storage cabinet. The key management box 30 in this embodiment can therefore reduce the risk of malicious use of the electronic key 1.

In the key management box 30 in this embodiment, the effective time data writing means 40 changes the effective time according to at least one of the user's attribute, the type of the article(s), and the installation place of the storage cabinet, and writes the changed effective time into the IC tag 13. Such key management box 30 stores the effective time suitable for the user, the article(s), and the installation place of the storage cabinet into the IC tag 13. This makes it possible to reduce opportunities of malicious use of a digital key by a third person as compared with the case where the effective time is set uniformly. Security can therefore be improved. Even if the electronic key 1 has lost the function as a key after a lapse of the effective time, in case the electronic key 1 is stolen by a third person, the user bears responsibility based on the use record remaining in the key management box 30. Users are therefore expected to return the electronic key 1 early. Accordingly, security can also be enhanced.

Meanwhile, if all the electronic keys 1 are removed for use from the key management box 30, there is no electronic key 1 to write the storage cabinet data and the ID data of a user therein. Thus, a personal key is no longer issued to a user. In this case, inconveniently, the user is not allowed to unlock the storage cabinet and bring out an article(s) such as a document file(s), a CD-ROM(s), and a USB memory(s). Nevertheless, if all the electronic keys 1 are personal keys, the number of electronic keys 1 to be managed increases, leading to an increased cost. It is further wasteful to give a personal key to even a person who uses it at low frequency. Consequently, the key management box 30 is configured to group the electronic keys 1 to be managed by the key hole units 38A to 38J and set different using conditions to different groups of the electronic keys 1.

Figure 10:
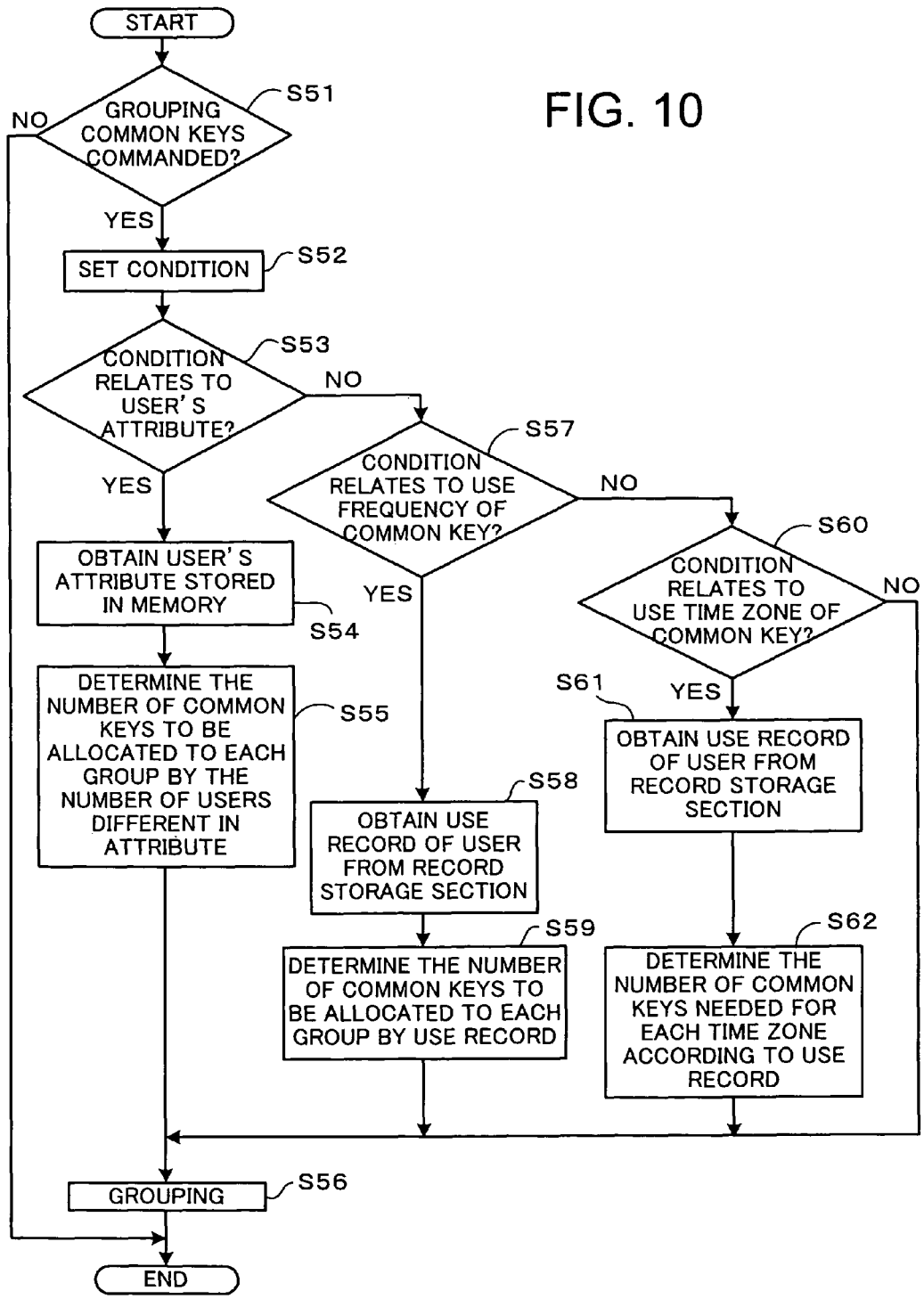
FIG. 10 is a flowchart showing a control method for grouping common keys.

FIG. 10 is a flow chart showing a program to group the common keys. This program is stored in the ROM 46 of the controller 44.

For example, if a user enters a command to group the common keys to the controller 44 or if the command to group the common keys is entered after a fixed time (e.g., one year) has passed from the latest grouping of the common keys, the controller 44 sets conditions for grouping the common keys (S51: YES and S52). The condition setting may be input by an administrator of the controller 44 every time the command of grouping the common keys is entered or the condition previously used for grouping common keys may be used after updating.

It is then determined whether the set condition relates to the user's attribute. In the case of the user's attribute, the controller 44 retrieves and obtains from its memory the attribute of a user permitted to use the electronic key 1 as a common key (e.g., an employee class, a manager class, and a general manager class) (S53: YES and S54). The number of users is counted according to each attribute, and the number of common keys to be allocated to each group is determined. For instance, if thirty users are permitted to use the electronic keys 1 as common keys, it is assumed that twenty users belong to the employee class, seven users belong to the manager class, and three users belong to the general manager class. The users of the general manager class are considered to use the electronic keys 1 at high frequency. Accordingly, three of the electronic keys 1 equal to the number of users belonging to the general manager class are allocated to a general manager class group. The users of the manager class are considered to use the electronic keys at low frequency than those of the general manger class but at high frequency than those of the employee class. Thus, the electronic keys 1 are allocated to a manager class group at a larger proportion than that for the users of the employee class which share the electronic keys 1. For example, three of the electronic keys 1 are allocated to the manager class group and four are allocated to an employee class group (S55).

Then, the key hole units 38 for managing the electronic keys 1 allocated to each group are determined to group the common keys. For instance, the electronic keys 1 for the general manager class group are managed by the key hole units 38A to 38C. The electronic keys 1 for the manager class group are managed by the key hole units 38D to 38F. Furthermore, the electronic keys 1 for the employee class group are managed by the key hole units 38G to 38J (S56). After that, the process is terminated.

The common keys grouped according to the users' attributes can be taken out as the electronic key 1 any time by every user of the general manager class when he/she comes to the key management box 30. The user can use the electronic key 1 as with the personal key. The users of the manager class to which the electronic keys 1 are not allocated on a one-to-one basis but they are allowed to more easily remove the electronic keys from the key management box 30 than the employees. By grouping the common keys according to the users' attributes, it is possible to reduce disadvantages that all the keys are removed for use from the key management box 30 by the employees and thus there is no electronic key 1 available to the users of the general manager class and the manager class.

In the case where the setting condition relates to the use frequency of the common keys, the use records of the users are read from the record storage section 49 and the users are grouped by the use frequency. To the group of the users who use the electronic keys 1 at high frequency, the electronic keys 1 in the number corresponding to the users who use the electronic keys at high frequency are allocated to permit the users of this group to use the electronic keys 1 any time. To the group of the users who use the electronic keys 1 at low frequency, the remaining electronic keys 1 are allocated. For example, six electronic key 1 are allocated to the group of users who use the electronic keys with high frequency and remaining four electronic keys 1 are allocated to the group of users who use the electronic keys with low frequency (S57: YES, S58, S59). As in the case of the users' attributes, the electronic keys 1 are grouped and then the process is terminated (S56).

This grouping of common keys according to the use frequency can reduce disadvantages that the electronic key 1 is unavailable to the users who use the electronic key 1 at high frequency.

In the case where the setting condition relates to the use time zone of the common keys, the use records of the users are read from the record storage section 49 and the users are counted by use time zones to group them according to the use time. The number of electronic keys 1 allocated to a user group for a use time zone in which many users use the electronic keys 1 is set to large and the number of electronic keys 1 allocated to a user group for a use time zone in which less users use the electronic keys 1 is set to small. For instance, seven electronic keys 1 are allocated to a user group for the use time zone of 9:00-12:00 and three electronic keys 1 are allocated to a user group for the use time zone of 11:00-14:00. Furthermore, a user group for the use time zone of 13:00-16: 00 does not overlap the time zone of 9:00-12:00. Thus, seven electronic keys 1 are allocated to this group (S60: YES, S61, S62). In the same manner as the case of users' attributes, the electronic keys 1 are grouped and the process is terminated (S56).

This grouping of common keys according to the use time zones can leave the electronic keys 1 in the number determined by the time zones in the key management box 30.

The key management box 30 with the common keys being grouped as above determines which group of the electronic keys 1 is permitted to be used by the user based on the information read from the user's IC card by the IC card reader 32. For example, if the user belongs to the manager class, the user is determined to be permitted to use any of the electronic keys 1 in the key hole units 38D to 38F. In this case, the key management box 30 writes the ID code of the subject user and the storage cabinet specifying data into the electronic key 1 in the key hole unit 38D, and unlocks the key lock means 41D and turns on the LED 43D. Accordingly, the user is permitted to remove the specially allocated common key from the key hole unit 38 to unlock the storage cabinet.

If the subject user returns the electronic key 1, the key management box 30 determines which group of the electronic keys 1 is permitted to be used by the user based on the information read from the user's IC card. Of the key hole units 38 of the group the user belongs to, a key unit 38 with the lock 35 in which no electronic key 1 is inserted is controlled to unlock the key lock means 41 and the LED 43 is turned on. For instance, when the user belonging to the above manager class intends to return the electronic key 1 and the key hole unit 38D is empty, the controller 44 unlocks the key lock means 41D and turns on the LED 43D. The user thus inserts and returns the electronic key 1 in the lock 35D for which the LED 43 is lighting. If only a return place of each electronic key 1 is any one of the key hole units 38 of the same group, it is not required to coincide with the place from which the electronic key 1 was initially removed. The electronic keys 1 of each group will be returned to any one of the key hole units 38 managing the electronic keys 1 of each group. Accordingly, the number of electronic keys 1 allocated to each group remains unchanged.

As above, the key management box 30 in this embodiment includes the grouping means (S52 to S62) for grouping the plurality of common keys into a first group conforming to a first condition and a second group conforming to a second condition. Accordingly, the common keys belonging to the first group and the common keys belonging to the second group can be used by the users under different conditions (e.g., users' attributes, frequencies of use of the common keys by the users, and use time zones of the common keys). This can solve the problems specific to the common key mode that no electronic key 1 is left in the key management box 30 for the users who use the electronic keys 1 at high frequency or in the time zone in which many electronic keys 1 are used.

<Combination Mode>

A combination mode is a mode to manage a plurality of the electronic keys 1 in a single key management box 30 by combining the personal key mode and the common key mode. A basic construction and others of the personal keys and the common keys are identical to those of the aforementioned personal keys and common keys. Thus, the following explanation will be given to only differences.

In the combination mode, the key management box 30 shown in FIG. 6, for example, the electronic keys 1 available as personal keys are held in the key hole units 38A to 38G and the electronic keys 1 available as common keys are held in the key hole units 38H to 38J.

The key hole units 38A to 38G holding the electronic keys 1 available as personal keys each include the data reading means 42 for reading ID data of the IC tag 13 and the first unlocking means for unlocking the key lock means 41 of a personal key having the ID data of the subject user when the IC card reader 32 identifies the specific user.

On the other hand, the key hole units 38H to 38J holding the electronic keys 1 available as common keys each include the data writing means 39 for writing, into the IC tag 13 of any one of the common keys, at least either one of the ID data of the subject user and the storage cabinet specifying data of the user when the IC card reader 32 serving as a personal authentication means identifies the specific user, and a second unlocking means for unlocking the key lock means 41 of the one common key.

For instance, the key management box 30 does not allocate the electronic key 1 available as a personal key to a person (an employee) who opens and closes a storage cabinet at low frequency but permits such a person to use any electronic key 1 held in the key hole units 38H to 38J. This is because the person who less opens and closes the storage cabinet uses the electronic key 1 at low frequency. On the other hand, the key management box 30 allocates the electronic key 1 available as a personal key for example to a person (a general manager) who opens and closes the storage cabinet at high frequency and the management box 30 manages the electronic key 1.

The key management box 30 executes the control program 50 corresponding to the personal key mode when the ID data read by the IC card reader 32 is the ID data of a person allocated a personal key. The key management box 30 unlocks the key lock means 41 of the key hole unit 38 holding the electronic key 1 of the user corresponding to the ID data. At that time, the key management box 30 writes the effective time data in the unlocked electronic key 1 by the effective time data writing means 40.

On the other hand, the key management box 30 executes the control program corresponding to the common key mode when the ID data read by the IC card reader 32 is the ID data of a person not allocated a personal key. Accordingly, the key management box 30 writes the access right (storage cabinet specifying data) to the storage cabinet which the subject user has an unlocking authority of and the effective time data into the electronic key 1 held in any one of the key hole units 38H to 38J. The key management box 30 unlocks the key lock means 41 of the key hole unit 38 holding the electronic key 1 in which the data is written, thereby permitting the electronic key 1 to be removed.

In such combination mode, a person who opens and closes the storage cabinet at high frequency has a personal key stored in the key management box 30 and therefore is permitted to remove the own electronic key 1 from the key management box 30 and unlock the storage cabinet to use the stored article(s). On the other hand, a person who opens and closes the storage cabinet at low frequency is permitted to use the electronic key 1 to unlock the storage cabinet and use the stored article(s).

According to the key management box 30 in this embodiment, therefore, even a person who uses the electronic key 1 at low frequency is permitted to unlock the storage cabinet by use of the common key. Since the plurality of users share the common keys, the number of electronic keys 1 to be managed by the key management box 30 can be reduced as compared with the case of management of personal keys individually allocated to users.

According to the key management box 30 in this embodiment, the IC tag 13 stores the use record of the used storage cabinet and the data reading means 42 reads the use record. When the user returns the electronic key 1 available as the common key to the key management box 30, the key management box 30 can obtain the use record of the electronic key 1. It is therefore possible to sufficiently manage the electronic key 1 by obtaining the use record thereof, specifically, which user removed the electronic key 1 at what time and used which storage box from what time to what time.

<Selection Mode>

A selection mode is a mode to permit a user to select one from the personal key mode, the common key mode, and the combination mode in relation to one key management box 30. A basic structure and others of the personal keys and the common keys are identical to those of the aforementioned personal keys and the common keys. Thus, the following explanation will be given to only differences.

In the selection mode, for example, only when a personal ID is read by the IC card reader 32 of the key management box 30 shown in FIG. 6 and that personal ID belongs to an administrator of the key management box 30, it is possible to select one of the personal key mode, the common key mode, and the combination mode by use of the numeric keypad operating part 33. After completion of selecting the mode, the key management box 30 manages the electronic keys 1 stored in the key hole units 38 according to the selected mode. Such key management box 30 is convenient because the management mode of the electronic keys 1 can be arbitrarily selected.

The present invention may be embodied in other specific forms without departing from the essential characteristics thereof.

(1) The key management box 30 in the above embodiment is provided with the door 31. Alternatively, even if the door 31 is not provided, removal of the electronic keys may be managed by the key lock means 41.

(2) According to the above embodiment related to the common key mode, the user enters the number of the storage cabinet the user intends to use (S34). However, since personal authentication was performed (S32), the controller 44 checks on the access right of the personally authenticated user in the access right storage section 48 and all the identification numbers of the storage cabinet to which the specific person has the access right may be written in the access right storage means of any one electronic key 1 (S36). This makes it unnecessary for the user to enter the number of each storage cabinet and makes it easy for the user to use the key management box 30.

(3) In the above embodiment, the electronic key 1 includes the contact IC tag 13. Alternatively, a non-contact IC tag may be used instead of the contact IC tag 13. A reader/writer device for reading/writing data in the non-contact IC tag may be provided in each key hole 35 in the key management box 30.

The invention claimed is:

1. A key management box for centrally storing and managing keys to be used by registered users whose ID data have been registered in advance in order to unlock locks of a plurality of storage cabinets placed in offices, the key management box comprising: a plurality of key lock means for holding the keys individually and inhibiting removal of the keys; a personal authentication means; and a lock unlocking means for unlocking the key lock means for a key permitted for an authenticated user personally authenticated by the personal authentication means,
wherein
each of the keys is a digital key including an IC tag storing ID data of the registered user and storage cabinet specifying data that specify two or more storage cabinets permitted for the user to unlock out of the plurality of storage cabinets, and each of the digital keys being able to unlock the locks of the two or more storage cabinets specified by the specifying data that specify the two or more storage cabinets, and
the key management box comprises a data reading means for reading the ID data of the IC tag; and
when the personal authentication means identifies the authenticated user, the lock unlocking means unlocks the key lock means for the key having the ID data determined to match with the ID data of the authenticated user by comparison between the ID data of the authenticated user and the ID data read by the data reading means.

2. The key management box according to claim 1, wherein the IC tag stores a record of use of the storage cabinet for the key having the IC tag, and
when the key is returned to the key management box, the data reading means reads the record of use.

3. The key management box according to claim 2, further comprising an effective time data writing means for writing, into the IC tag, each effective time data representing an effective time for which each storage cabinet is permitted to be unlocked by use of the storage cabinet specifying data.

4. The key management box according to claim 1, further comprising an effective time data writing means for writing, into the IC tag, each effective time data representing an effective time for which each storage cabinet is permitted to be unlocked by use of the storage cabinet specifying data.

5. The key management box according to claim 4, wherein the effective time data writing means changes the effective time according to at least one of an attribute of the user, a type of an article, and an installation place of the storage cabinet and writes the changed effective time into the IC tag.

6. A key management box for centrally storing and managing common keys to be used by a plurality of registered users whose ID data have been registered in advance in order to unlock locks of a plurality of storage cabinets placed in offices, the key management box comprising: a plurality of key lock means for holding the common keys individually and inhibiting removal of the common keys; a personal authentication means; and a lock unlocking means for unlocking the key lock means for a common key permitted for an authenticated user personally authenticated by the personal authentication means,
wherein
each of the common keys is a digital key including an IC tag storing at least one of ID data of the authenticated user and storage cabinet specifying data that specify two or more storage cabinets permitted for the authenticated user to unlock out of the plurality of storage cabinets, and each of the common keys being able to unlock the locks of the two or more storage cabinets specified by the specifying data that specify the two or more storage cabinets, and
the key management box comprises:
a data reading means for reading the ID data of the IC tag; and
a data writing means for writing, into the IC tag of any one common key selected from the common keys identified by the data reading means, at least one of the ID data of the authenticated user and storage cabinet specifying data of the storage cabinets permitted for the authenticated user to unlock when the personal authentication means identifies the authenticated user;
the lock unlocking means unlocks the key lock means for the selected common key in which the data writing means writes the data.

7. The key management box according to claim 6, wherein the IC tag stores a record of use of the storage cabinet for the selected common key having the IC tag, and
the data reading means reads the record of use when the selected common key is returned to the key management box.

8. The key management box according to claim 7, further comprising a grouping means for grouping the common keys into a first group complying with a first condition and a second group complying with a second condition,
wherein the grouping means creates the first and second groups based on at least one of attributes of the authenticated users, frequencies of use of the common keys by the authenticated users, and an effective time permitted of use of the common keys by the authenticated users.

9. The key management box according to claim 8, further comprising an effective time data writing means for writing, into the IC tag, each effective time data representing an effective time for which each storage cabinet is permitted to be unlocked by use of the storage cabinet specifying data.

10. The key management box according to claim 7, further comprising an effective time data writing means for writing, into the IC tag, each effective time data representing an effective time for which each storage cabinet is permitted to be unlocked by use of the storage cabinet specifying data.

11. The key management box according to claim 6, further comprising a grouping means for grouping the common keys into a first group complying with a first condition and a second group complying with a second condition,
wherein the grouping means creates the first and second groups based on at least one of attributes of the authenticated users, frequencies of use of the common keys by the authenticated users, and effective time permitted of use of the common keys by the authenticated users.

12. The key management box according to claim 11, further comprising an effective time data writing means for writing, into the IC tag, each effective time data representing an effective time for which each storage cabinet is permitted to be unlocked by use of the storage cabinet specifying data.

13. The key management box according to claim 6, further comprising an effective time data writing means for writing, into the IC tag, each effective time data representing an effective time for which each storage cabinet is permitted to be unlocked by use of the storage cabinet specifying data.

14. A key management box for centrally storing and managing keys to be used by registered users whose ID data have been registered in advance in order to unlock locks of a plurality of storage cabinets placed in offices, the key management box comprising: a plurality of key lock means for holding the keys individually and inhibiting removal of the keys; a personal authentication means; and a lock unlocking means for unlocking the key lock means for key permitted for an authenticated user personally authenticated by the personal authentication means,
wherein
the keys include:
a personal key that is a digital key including an IC tag storing ID data of the registered user and storage cabinet specifying data for specifying two or more storage cabinets permitted for the registered user to unlock out of the plurality of storage cabinets, the personal key being allocated one to each person, and able to unlock the locks of the two or more storage cabinets specified by the specifying data that specify the two or more storage cabinets; and a common key that is a digital key including an IC tag storing ID data of the registered user and storage cabinet specifying data for specifying two or more storage cabinets permitted for the registered user to unlock out of the plurality of storage cabinets, the common key being used in common by a plurality of the registered users, and able to unlock the locks of the two or more storage cabinets specified by the specifying data that specify the two or more storage cabinet, and the key management box comprises:

a data reading means for reading the ID data of the IC tag; and a data writing means for writing, into the IC tag of any one common key selected from common keys identified by the data reading means, at least one of the ID data of the authenticated user who is permitted to use the common key and storage cabinet specifying data of the storage cabinets permitted for the authenticated user to unlock when the personal authentication identifies the authenticated user;

the lock unlocking means comprises:

a first lock unlocking means for unlocking the key lock means for the personal key having the ID data determined to match with the ID data of the authenticated user by comparison between the ID data of the authenticated user and the ID data read by the data reading means when the personal authentication means identifies the authenticated user allocated with the personal key; and a second lock unlocking means for unlocking the key lock means for the common keys in which the data writing means writes the data when the authenticated user permitted to use the common key is identified by the personal authentication means.

15. The key management box according to claim 14, further comprising a grouping means for grouping the common keys into a first group complying with a first condition and a second group complying with a second condition, wherein the grouping means creates the first and second groups based on at least one of attributes of the authenticated users, frequencies of use of the common keys by the authenticated users. and an effective time permitted of use of the common keys by the authenticated users.

16. The key management box according to claim 15, further comprising an effective time data writing means for writing, into the IC tag, each effective time data representing an effective time for which each storage cabinet is permitted to be unlocked by use of the storage cabinet specifying data.

17. The key management box according to claim 14, further comprising an effective time data writing means for writing, into the IC tag, each effective time data representing an effective time for which each storage cabinet is permitted to be unlocked by use of the storage cabinet specifying data.

* * * * *